Oct. 25, 1932.　　J. L. ROBBINS　　1,884,872

THERMOSTATIC SWITCHING DEVICE

Filed July 29, 1931

Inventor
John L. Robbins.
By A. J. O'Brien
Attorney

Patented Oct. 25, 1932

1,884,872

UNITED STATES PATENT OFFICE

JOHN L. ROBBINS, OF DENVER, COLORADO

THERMOSTATIC SWITCHING DEVICE

Application filed July 29, 1931. Serial No. 553,831.

This invention relates to improvements in thermostats and has reference more particularly to a thermostat intended to be used in connection with electrically heated incubators.

In apparatus where a constant temperature is to be maintained, as, for example, in incubators of the type employed for incubating eggs as well as incubators for other purposes, it is necessary to maintain a substantially constant temperature for a long period of time. The most convenient way of obtaining the necessary heat for such incubators is by the use of electrical heaters. In order to regulate the temperature it is necessary to provide a thermo responsive mechanism which will control the flow of current to the electric heaters, either by varying the amount of current that flows through the heater elements, or by periodically disconnecting the heater from the source of current. As the heaters employed in connection with large incubators consume a considerable amount of current, it is essential that the thermo responsive device by which they are controlled shall be of such size and strength that it can operate the circuit closers required for controlling the current.

It is the object of this invention to produce a thermo responsive circuit closer that shall be especially well adapted for use with incubators of the type employed for incubating eggs and which shall be very sensitive to variations in temperature and which shall also be sufficiently powerful to properly operate the control switches.

This invention briefly described consists of a pivoted switch lever one end of which is normally maintained in contact with an electrical contact by means of a spring and with which is associated a thermo responsive element that opens the normally closed circuit when the temperature within the incubator reaches a predetermined value, and which closes the normally open circuit and thereby makes it available for changing the connections to an electric heating element in a manner which will be hereinafter fully described.

Having thus briefly described the invention, the same will now be described in detail and for this purpose reference will be had to the accompanying drawing in which the preferred embodiment of the invention has been illustrated, and in which.

Figure 1:
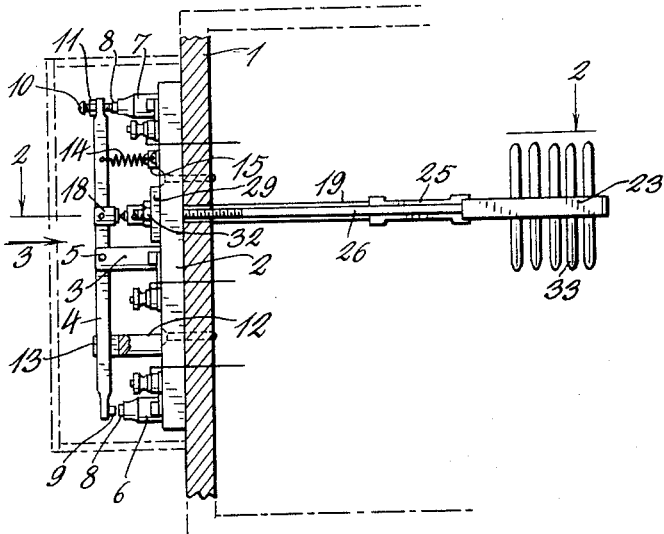
Fig. 1 is a side elevation of the thermostatic control device looking in the direction of arrow 1 in Fig. 2.
Figure 2:
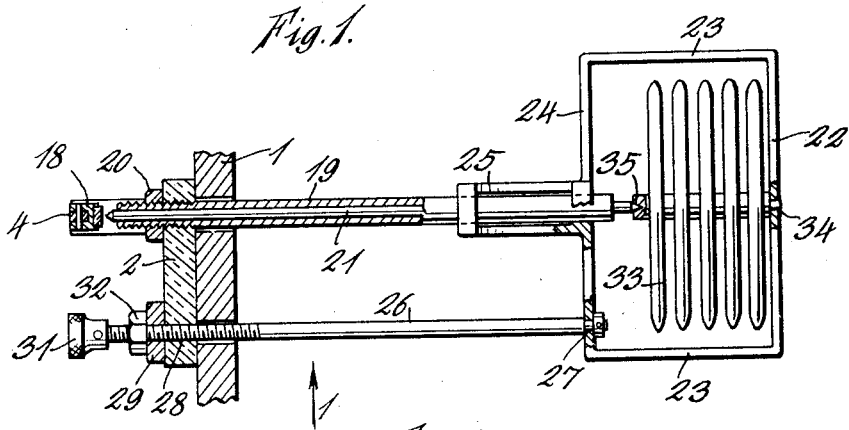
Fig. 2 is a top plan view of the device partly in section taken on line 2—2, Fig. 1.
Figure 3:
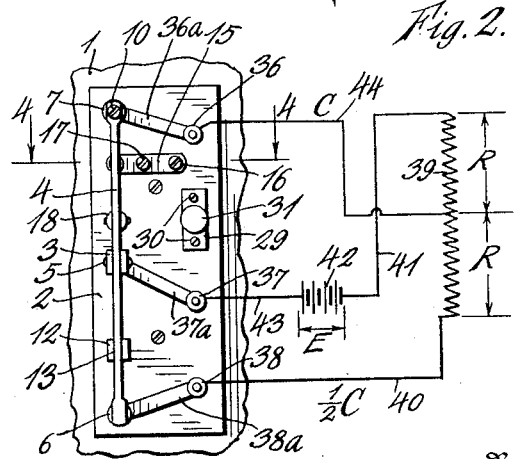
Fig. 3 is a plan view of the switch looking in the direction of arrow 3 in Fig. 1.
Figure 4:
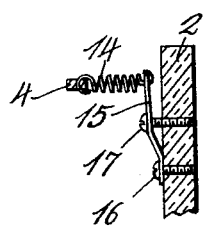
Fig. 4 is a section taken on line 4—4, Fig. 3.

In the drawing reference numeral 1 indicates one wall of an incubator or other chamber whose interior is to be maintained at a given temperature. The thermostatic control device which forms the subject matter of this invention comprises a base 2 made from any suitable insulating material. Secured to this base is a vertical standard 3 which also serves as a terminal and whose outer end is provided with a transverse groove within which is located the movable switch member 4. Member 4 is pivoted to the standard or terminal 3 at 5. The base 2 is also provided with two spaced stationary switch contacts 6 and 7 which are preferably formed from brass and which are each provided with a plug 8 of tungsten or platinum or other refractory conducting material which is highly resistant to the action of an electric arc. One end of switch member 4 is provided with a lug 9 that is adapted to make electrical contact with plug 8 and the other end thereof is provided with a screw 10 whose end is adapted to make electrical connection between it and the plug 8 carried by contact 7. Screw 10 is adjustable and is held in adjusted position by means of a nut 11. For the purpose of guiding the switching member 4, a standard 12, similar to standard 3, has been secured to the base. This standard is provided at its outer end with a slot 13 and serves to prevent sidewise motion of member 4. A spring 14 has one end connected with switch member 4 and the other end connected to the outer end of the spring 15, Fig. 4. Spring 15 is connected to base 2 by means of a screw 16 and has its free end offset in the manner shown. A screw 17 extends through an opening in spring 15 and has threaded engagement with the base 2 so that when this screw is rotated the tension of the spring 14 will be increased or decreased as desired. A lug 18 is secured to the movable switch member 4 between the pivot 5 and the point where spring 14 is connected to this member. Spring 14 is normally under tension and tends to maintain the end of screw 10 in electrical contact with contact 7. For the purpose of moving the switch member 4 in accordance with the temperature changes I have provided a heat responsive mechanism which will now be described. A tube 19 has a threaded connection with the base 2 in the manner shown in Fig. 2 and is held against rotation by means of a lock nut 20. This tube is located so that its axis is directly underneath the plug 18. A rod 21 is located within the tube and is somewhat longer than the tube so that it extends from both ends of the latter. Secured to the inner end of the tube is a frame comprising a base member 22, side members 23, a top member 24 of the frame, as indicated at 27, and has its other end extending through a hole 28 in base 2. A nut 29 is secured to the base and is held in place thereon by means of screws 30. Rod 26 has its outer end threaded and in engagement with the threaded opening in nut 29. The outer end of rod 26 is also provided with a knurled head 31 by means of which it can be rotated. A lock nut 32 serves to hold the rod 26 against accidental rotation. It is evident from the above, when taken in connection with Fig. 2, that when rod 26 is rotated it will move the rectangular frame inwardly or outwardly along tube 19, depending on the direction in which the rod is rotated. Located within the rectangular frame is a thermo responsive element consisting of a plurality of thermo responsive wafers 33 which are connected together in the manner shown. One of these wafers has a lug 34 that extends through a hole in base member 22, while the wafer at the other end of the series has a lug 35 provided with a recess for the reception of the inner end of rod 21. These wafers are of a well-known construction and are formed from thin sheet metal and are hollow and have their interiors provided with a volatile liquid, or with a gas that expands when heated. As the pressure on the interior of the wafers increases beyond that of the atmosphere, they become thicker and move the rod 21 outwardly thereby rotating the switch member 24 against the tension of spring 14 so as to open the electric circuit at contact 7. If this expansion continues after contacts 7 and 10 have separated, contact 9 will be moved into electrical contact with plug 8 and a new circuit established. As the wafers cool down, their thickness decreases with the result that spring 14 will return the switch member 4 to the position shown in Fig. 1. The base is provided with three spaced connectors 36, 37 and 38. Connector 36 is connected with the contact 7 by means of a conductor 36a; connector 37 is connected with the standard or terminal 3 by means of a conductor 37a and connector 38 is connected with the contact 6 by means of a conductor 38a. The above described thermo responsive circuit changing device may be used in several different ways, but as an example of one way of connecting the device with an electric heating element, I have shown a resistance 39, one end of which is connected with the connector 38 by means of a conductor 40 and the other end of which is connected by means of a conductor 41 to one pole of an electric battery 42, whose other pole is connected with the connector 37 by means of a conductor 43. The battery merely illustrates a source of power and instead of the battery, connection can be made with a lighting circuit of a house or with any other suitable source of electric current. The center point of the resistance has been connected with connector 36 by means of a conductor 44. As an example of the manner in which the apparatus described can control the amount of heat generated by the resistance 39, the following example will be given. The resistance will be considered as having a value of 2R and has been shown as divided into two equal parts. If we consider that the voltage of the source of electric current is E, the value of the current that flows through one-half of the heater when the circuit control device is in normal position, is E divided by R, which we will represent by C, and the heat generated will therefore be $C^2R$. If the circuit connections are now changed so as to break the contact between screw 10 and plug 8 and establish contact between 8 and 9, the current will flow through the entire resistance element and the value of the current will therefore be E divided by 2R, which is one-half of the value it had before the circuit connections were changed, and the heat generated will then be represented by the square of the current multiplied by 2R from which it will be seen that the heat produced will be one-half of the amount produced when the parts are in normal position. The resistance should be so selected that when the entire resistance is connected in the circuit the heat generated is less than what is actually required to maintain the parts at the temperature desired, while with the parts in normal position a greater amount of heat is generated than is necessary for the purpose of maintaining the temperature desired.

The example given above is merely illustrative as it is possible to employ the device described herein in connection with other circuits for the accomplishment of the same or similar results, and I therefore do not want to be limited to the circuit connection shown. Since the function of the tubular member 19 is to support the thermo-responsive element, it does not necessarily have to be tubular as the rod 21 will function equally well if it does not pass through this support.

From the above description it will be apparent that I have produced a simple and substantial thermostatic control device which is so constructed that the thermostatic element may be placed inside of a chamber whose temperature is to be controlled while the switch contacts and other operative parts are located outside of the chamber so as to be readily accessible for inspection and repairs, and which is also so constructed that it can be adjusted to operate at different temperatures by means of a simple adjusting device readily accessible from the outside.

Having described the invention, what is claimed as new is:

1. A thermo responsive switching device comprising in combination a base, two spaced switch contacts mounted thereon, a stationary terminal located between the contacts, a switch member pivotally connected with the stationary terminal and movable into engagement with either of the two contacts, resilient means for urging the switch member into engagement with one of the contacts, the base having an opening, a rod extending through the opening in the base, a support secured to the base and projecting therefrom, a thermo responsive element attached to the free end of the support for moving the rod and the switch member for opening the normally closed circuit whenever the temperature to which the thermo responsive element is exposed attains a predetermined value.

2. A thermo responsive switching device comprising, in combination, a base having an opening, two spaced switch contacts carried by the base, a stationary terminal located between the contacts, a switch member pivotally connected with the stationary terminal and movable into contact with either of the two contacts, resilient means for urging the switch into engagement with one of the contacts, a support having one end connected with the base, a rod having one end passing through the opening in the base and mounted for longitudinal movement in the direction of its length, a thermo responsive element secured to the free end of the support, one end of the rod engaging the thermo responsive element, whereby it will be moved in response to temperature changes, said rod and thermo responsive element serving as means for moving the switch member in accordance with the temperature conditions to which the thermo responsive element is subjected.

3. A thermo responsive switching device comprising, in combination, a base, two spaced switch contacts thereon, a stationary terminal located between contacts, a movable switch member pivotally connected with the stationary terminal and movable into engagement with either contact, means for urging the movable switch member into engagement with one of the contacts, a tubular support extending through a hole in the base, a rod slidable within the tubular member, and thermo responsive device secured to the free end of the tubular member for moving the rod outwardly against the movable switch member for opening the normally closed circuit whenever the temperature to which the thermo responsive device is exposed exceeds a predetermined value and for moving the movable switch member into contact with the other stationary switch contact.

4. A thermo responsive switching device comprising, in combination, an insulating base, two spaced switch contacts on one side of the base, a stationary terminal also secured to the base, a movable switch member pivotally connected with the stationary terminal and adapted to move into and out of circuit closing relation with the two contacts, a spring connected with the movable switch member and with the base and adapted to move the former into engagement with one of the contacts, a supporting member having one end secured to the base and projecting from the latter, a thermo responsive device movably secured to the free end of the supporting member, means for moving the thermo responsive device with respect to the supporting member, and means for connecting the thermo responsive device with the movable switch, said thermo responsive device and connecting means comprising a means for moving the movable switch member about its pivot when the temperature to which the thermo responsive device is subjected is varied.

5. A thermo responsive switching device comprising, in combination, an insulating base, two spaced switch contacts on one side of the base, a stationary terminal also secured to the base, a movable switch member pivotally connected with the terminal and adapted to move into and out of circuit closing relation with the two contacts, a spring connected with the movable switch member and with the base and adapted to move the switch member to circuit closing position with one of the contacts, a tubular member extending through an opening in the base and projecting from the under side of the base, a frame slidably connected with the free end of the tubular member, means for adjusting the position of the frame along the tubular member, a thermo responsive device secured to the frame, and a movable member connecting the thermo responsive device with the movable switch member, said thermo responsive device and movable member comprising means for moving the switch member about its pivot when the temperature to which the thermo responsive device is subjected is varied.

6. A thermo responsive switching device comprising, in combination, an insulating base, two stationary switch contacts secured to one side of the base, a terminal also secured to the base, a movable switch member pivotally connected with the switch terminal and adapted to be moved into and out of circuit closing connection with either one of the contacts, means comprising a spring for normally maintaining the movable switch member in circuit closing relation with one of said contacts, a tubular member having one end extending through an opening in the base, a frame slidably secured to the free end of the tubular member, means for moving the frame in either direction along the tubular member, a thermo responsive device carried by the frame, and means for communication movement from the thermo responsive device to the movable switch member whereby the position of the latter is varied in accordance with the temperature to which the responsive device is subjected.

In testimony whereof I affix my signature.

JOHN L. ROBBINS.